United States Patent [19]

Orii

[11] Patent Number: 4,595,555

[45] Date of Patent: Jun. 17, 1986

[54] POWER PLANTS

[75] Inventor: Shoichi Orii, Kawasaki, Japan

[73] Assignee: Tokyo Shibaura Denki Kabushiki Kaisha, Kanagawa, Japan

[21] Appl. No.: 580,285

[22] Filed: Feb. 17, 1984

Related U.S. Application Data

[63] Continuation of Ser. No. 293,506, Aug. 17, 1981, abandoned.

[30] Foreign Application Priority Data

Aug. 26, 1980 [JP] Japan .................. 55-117376

[51] Int. Cl.⁴ .................. G21C 9/00; G21C 15/18
[52] U.S. Cl. .................. 376/283; 376/282
[58] Field of Search .................. 376/282, 283

[56] References Cited

U.S. PATENT DOCUMENTS

| | | | |
|---|---|---|---|
| 3,605,362 | 9/1971 | Sweeney | 376/283 |
| 3,668,069 | 6/1972 | Ullrich et al. | 376/283 |
| 3,819,476 | 6/1974 | Pocock et al. | 376/282 |
| 3,865,688 | 2/1975 | Kleimola | 376/283 |
| 3,899,391 | 8/1975 | Sulzer et al. | 376/283 |
| 4,080,256 | 3/1978 | Braun et al. | 376/282 |
| 4,138,319 | 2/1979 | Schabert et al. | 376/282 |
| 4,210,614 | 7/1980 | Kleimola | 376/283 |

FOREIGN PATENT DOCUMENTS

| | | | |
|---|---|---|---|
| 1939094 | 12/1970 | Fed. Rep. of Germany . | |
| 2057405 | 6/1972 | Fed. Rep. of Germany | 376/283 |
| 2452490 | 5/1977 | Fed. Rep. of Germany . | |
| 0066187 | 6/1977 | Japan | 376/283 |
| 0010885 | 1/1979 | Japan | 376/283 |

Primary Examiner—Harvey E. Behrend
Attorney, Agent, or Firm—Stevens, Davis, Miller & Mosher

[57] ABSTRACT

In a nuclear power plant, a reactor building and a building annex to this reactor building are constructed as a unitary reactor combination building in which a condensate storage tank is accommodated and the inner wall of the condensate storage tank is lined with stainless steel plates.

4 Claims, 4 Drawing Figures

POWER PLANTS

This application is a continuation of application Ser. No. 293,506, filed 8/17/81, now abandoned.

BACKGROUND OF THE INVENTION

This invention relates to a nuclear power plant including a reactor combination building in which a condensate storage tank is accommodated.

Generally, in a nuclear power plant, particularly including a BWR (Boiling Water Reactor), a condensate storage tank is installed for storing excess condensate and water as an emergency water source of a reactor coolant injection system or a low or high pressure coolant injection system for suppressing superheat in a reactor core in case of loss of coolant accident. In a known type nuclear power plant, the condensate storage tank building is located as an independent structure separated from a reactor building in the same site of the power plant and the tank building is connected through a conduit laid above or under the ground surface.

The independent location of the condensate storage tank building apart from the reactor building hinders effective utilization of the site of the nuclear power plant. The condensate storage tank building includes a shielding made of concrete which surrounds the condensate storage tank with a certain space therebetween for preventing leakage of radiation of the condensate stored in the tank. Further, a flashing board or equipment is provided for the tank for preventing rain water from entering into a portion, i.e. the space desbribed above, where the leakage of the condensate from the tank is detected. The provision of the concrete shielding and flashing equipment complicates and enlarge the condensate storage tank building.

In addition, since the condensate storage building is installed independently of the reactor building and directly exposed to wind, rain, snow, or the like, the maintenance and inspection must be carried out frequently. Since the nuclear power plant is often installed at an area near a sea shore, consideration of salt injury is necessary. In a case when the nuclear power plant is installed in an area subject to cold weather, heating means for the condensate storage tank is additionally required.

Moreover, in many cases, a nuclear power plant installation area does not satisfy desired conditions of civil engineerings and since the reactor building and a condensate storage building are independently installed on a hard rock bed at a depth of about 40-50 m under the ground surface, troublesome excavating works are required.

SUMMARY OF THE INVENTION

It is an object of this invention to provide a nuclear power plant including a single reactor combination building in which not only a reactor but also a plurality of condensate storage tanks lined by stainless steel plates are disposed.

Another object of this invention is to provide a nuclear power plant by which problems in a civil engineering at the time of installating the plant in prior art can be avoided.

A further object of this invention is to provide a condensate storage tank which is less affected by a bad weather condition such as rain, wind, snow or the like and has high reliability in its operation.

According to this invention, there is provided a nuclear power plant including a reactor building, a condensate storage tank, and a building annex to the reactor building and in the nuclear power plant the reactor building and the annex building are constructed as a unitary reactor combination building in which the condensate storage tank is accommodated and the condensate storage tank is lined with a metal plate.

DESCRIPTION OF THE PREFERRED EMBODIMENTS

Figure 1:
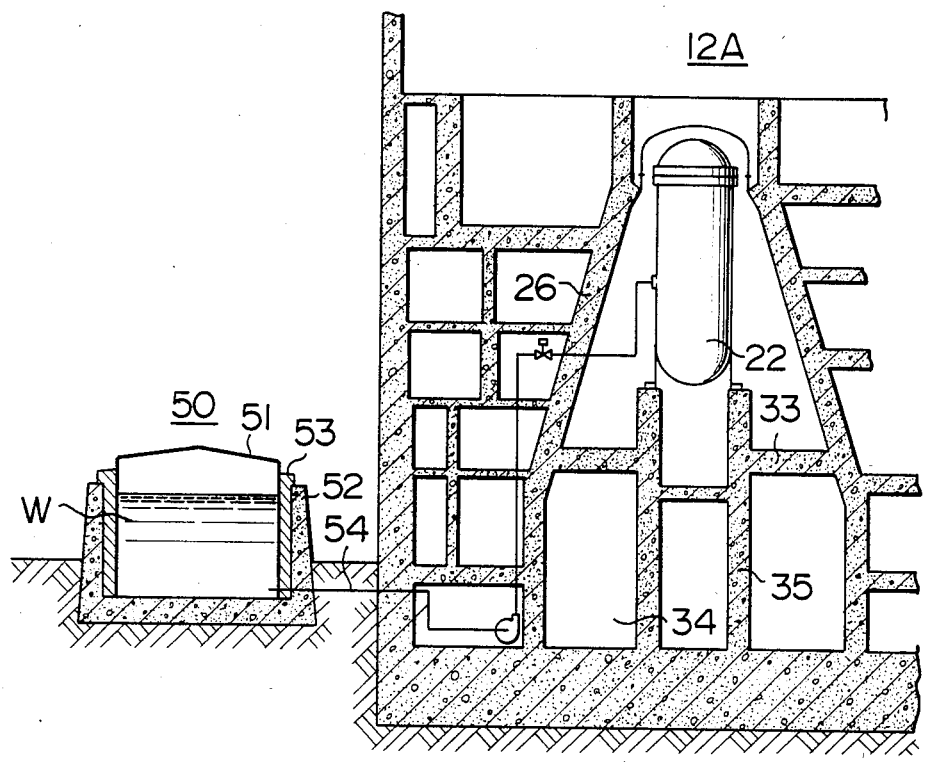
FIG. 1 is a schematic sectional view showing positional relationship between a condensate storage building and a reactor building in a conventional nuclear power plant.

In a known type nuclear power plant shown in FIG. 1, a condensate storage building 50 is installed independently of a reactor building 12A and within the storage building 50 is provided a condensate storage tank 51 filled with condensate W. A shielding wall 52 made of concrete surrounds the tank with a certain space therebetween for preventing leakage of radiations of the condensate W from dispersing outwardly. A flashing member 53 is disposed between the condensate storage tank 51 and the shielding wall 52 for preventing, for example, rain water from entering into a portion, i.e. the space described above, where leakage detection is carried out. The condensate storage tank 51 is connected to a reactor pressure vessel 22 by a conduit 54 buried under the ground and extending through the outer wall of a reactor building 12A and the peripheral wall of a reactor container 26. The height of the ceiling of the tank 51 must be designed by taking account of the height of a sloshing caused by an earthquake so as not to damage the ceiling or disperse the condensate, and therefore, a large extra space is required between the ceiling and the surface of the condensate W stored in the tank.

Figure 2:
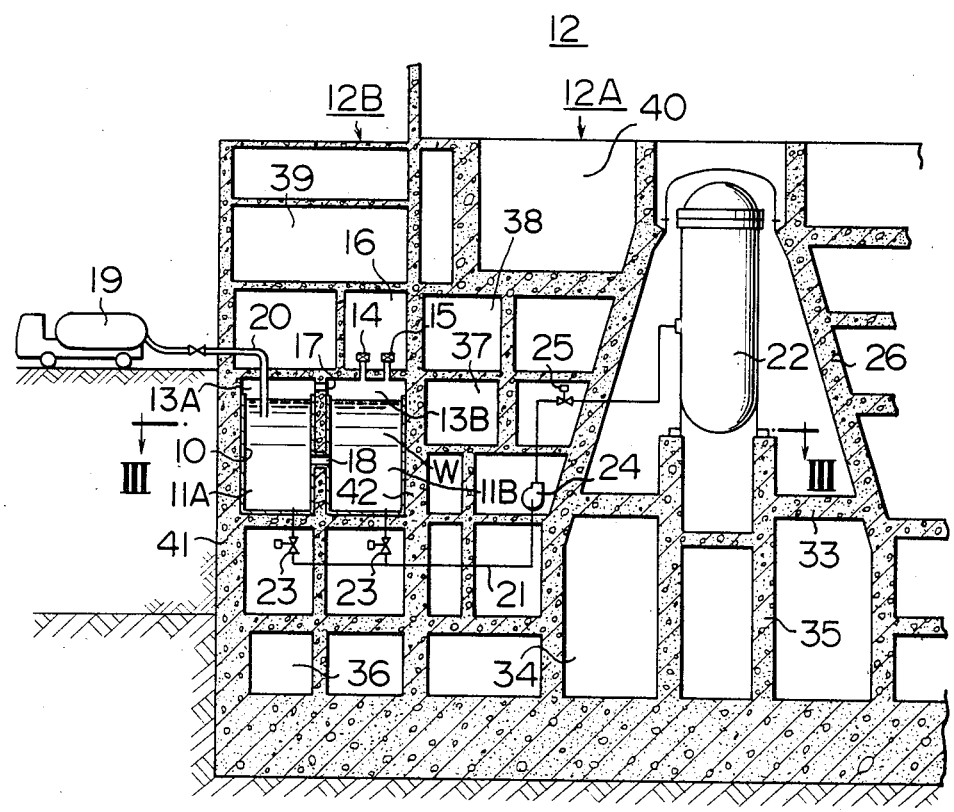
FIG. 2 is a schematic sectional view of a reactor combination building of a nuclear power plant according to this invention.

FIG. 2 is a schematic diagram of a reactor combination building 12 according to this invention which comprises main and annex buildings 12A and 12B. The main building 12A is a known type reactor building and the annex building 12B is a so-called radioactive disposal waste system building, hereinafter called a "Rad Waste building", which was located apart from the reactor building 12A in a prior art. The combination building is installed on a hard rock foundation 31 exposed after a soft surface soil 30 has been excavated.

As shown in FIG. 2, in the Rad Waste building 12B of the combination building 12, two adjacent condensate storage tanks 11 (11A and 11B) are disposed, and the inside walls of the tanks 11 are lined with stainless steel plates 10. Condensate W fills each tank 11 and the space above the surface of the condensate W in each storage tank is called an air chamber 13 (13A or 13B). The air chambers 13 of the both storage tanks 11 are communicated with each other through a communication pipe 17 provided in a partition wall between the two tanks 11 and the air chambers 13 are also communicated with an air exhaust chamber 16 containing an air conditioning or treating unit, not shown, through a breather valve 14 and a vacuum break valve 15.

The condensate storage tanks 11 are communicated with each other through a communication pipe 18 provided for the partition wall common to that of the air chambers 13 so that the condensate W in the both tanks 11 can circulate freely. The condensate can be supplemented in an emergency from an external source, for example, a tank lorry 19 as shown in FIG. 2 through a supply conduit 20 having one end immersed in the condensate W in one storage tank 11A and the other end extending outwardly through the wall of the combination building 12. From this point of view, it is desirable to locate the condensate storage tanks 11 to a position where the upper level of the condensate W is lower than the ground surface, but the tanks 11 can be located at a level above the ground surface, and in the latter case, it is necessary to provide a condensate supply pump for the conduit 20.

The condensate storage tanks 11 are connected to a reactor pressure vessel 22 by a conduit 21 extending through the wall of a reactor container 26. The conduit 21 is provided with an automatically operative valve 23, a condensate supply pump 24, and a valve 25. The interior of the reactor container 26 surrounding the reactor pressure vessel 22 is divided by a partition floor 33 into an upper drywell space and a lower suppression chamber 34. The reactor pressure vessel 22 is firmly supported by a pedestal 35 within the reactor container 26.

In the reactor combination building 12, are formed many independent chambers including, for example, chambers 36, 37, 38, 39, and 40 for containing a Rad Waste system pump, an air conditioning unit, a fuel pool cooling and filtering unit, a motor for driving a recirculation pump, and a fuel pool, respectively, but these chambers or units are well known in the art and not directly related to this invention, so that the details thereof are not described herein.

Figure 3:
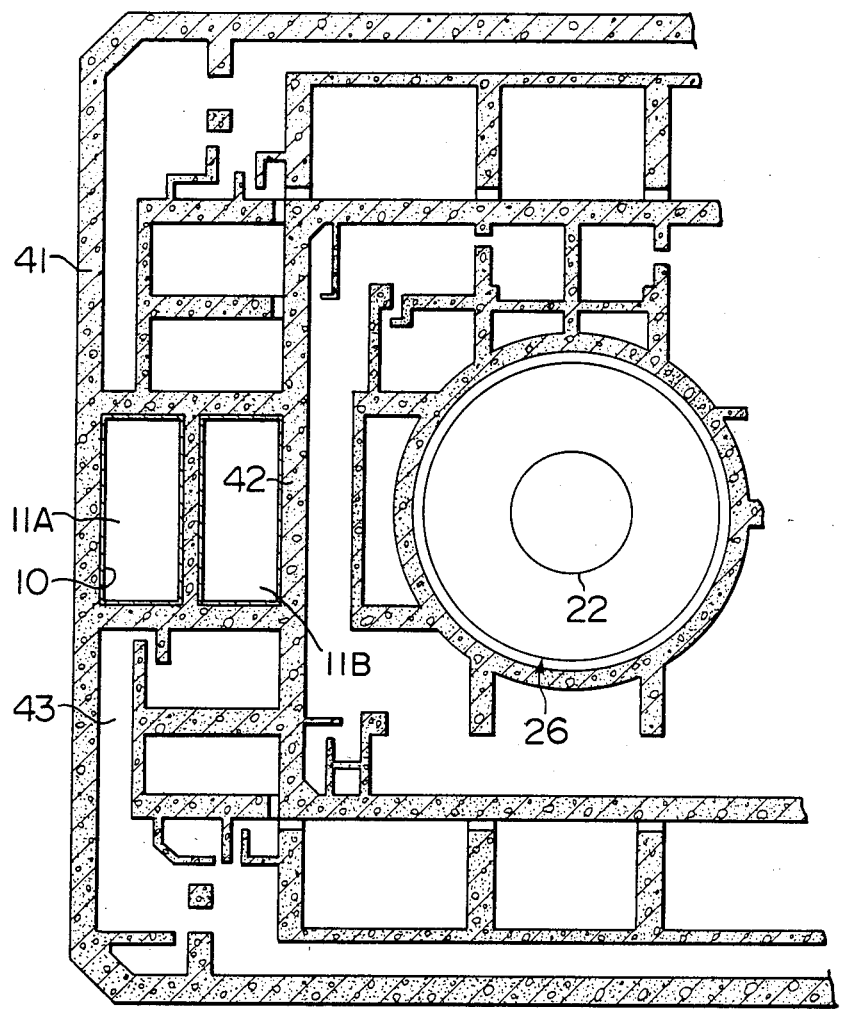
FIG. 3 is a cross sectional view taken along the line III—III shown in FIG. 2.
Figure 4:
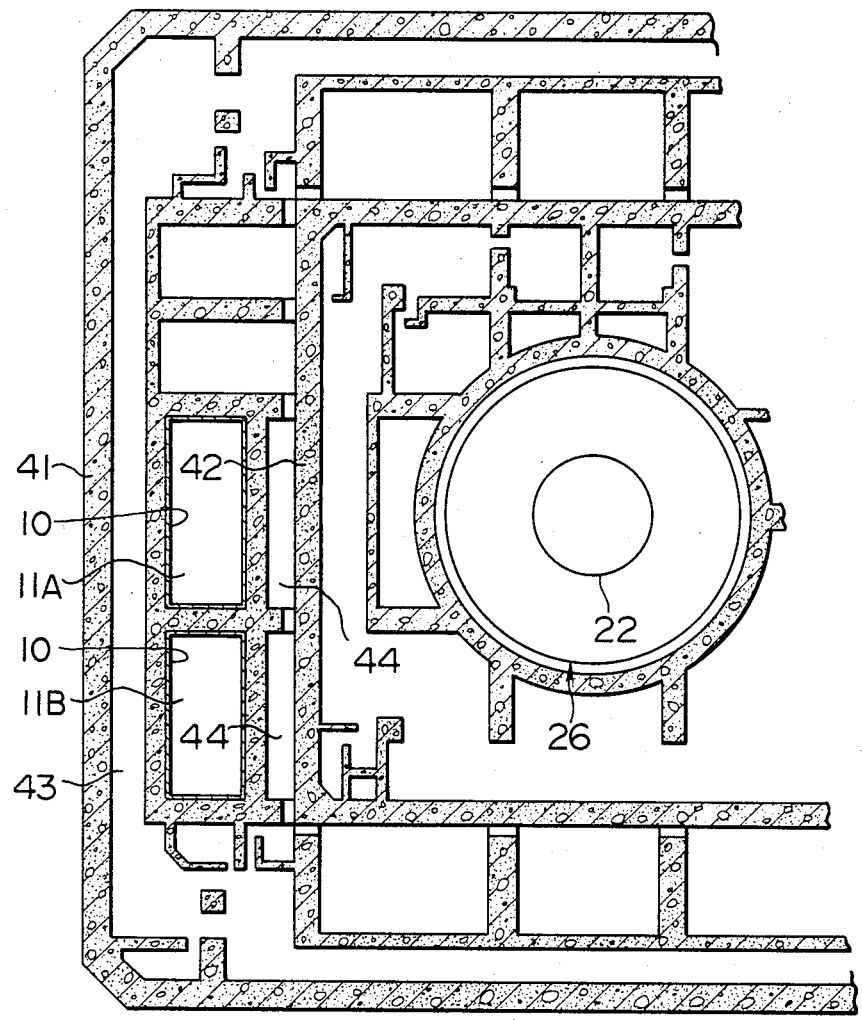
FIG. 4 is a cross sectional view of a modification of that shown in FIG. 3.

FIG. 3 shows a cross sectional view taken along the line III—III shown in FIG. 2, in which the outer walls of the condensate storage tanks 11 are formed by the concrete walls 41 and 42 of the combination building 12 and the reactor building 12A. FIG. 4 also shows a cross sectional view of another embodiment of this invention which is a modification of FIG. 3, in which the walls of the tanks 11 are independently constructed of the walls 41 and 42 with space defined therebetween, within which a passage 43 and conduit chambers 44 are formed. This embodiment has several merits which will be described hereinafter.

In an accident where the coolant in the nuclear reactor is lost, the valve 23 provided for the conduit 21 automatically opens and the condensate supply pump 24 operates to raise the inner pressure of the conduit 21 to a predetermined value and open the valve 25 thereby to supply the condensate W from the storage tank 11A or 11B into the reactor core in the pressure vessel 22. When the condensate W flows out from the tank and the level of the condensate W rapidly lowers to create a negative pressure in the tank lower than a normal pressure in the air chamber, the breather valve 14 is opened against the force of a spring provided for the valve 14 to introduce air into the air chamber 13B from the chamber 16, thus preventing the lining plates 10 from peeling off from the inner wall of the condensate storage tanks 11. When the breather valve 14 is out of order by some cause, or when it is required to introduce air by an amount in excess of the capacity of the valve 14, the vacuum break valve 15 operates to admit required amount of air. The breather valve 14 ordinarily operates to limit the free escape of the radioactive air in the air chambers 13 into the atmosphere in the combination building 12, but when the valve 14 operates and the radioactive air in the air chambers 13 is released into the atmosphere in the combination building 12 through the valve 14, the air is introduced into the chamber 16 containing the air conditioning and treating unit, where the radioactive air is removed of radioactive substances, thereby to prevent the contamination of the atmosphere in the combination building 12. The condensate W in one storage tank flows into the other storage tank through the communication pipe 18, which is enhanced when there is a temperature difference between the condensates W in the both tanks 11. Since the condensates W in the both tanks 11 freely move through the pipe 18, the condensates W above the level of this pipe 18 are commonly used for both tanks 11, so that the amount of the condensate W to be stored and used in an emergency can be optionally determined by changing the level at which the communication pipe 18 is located without changing the overall capacity of the tanks 11.

Because the both air chambers 13 are communicated with each other through the communication pipe 17, the pressure and temperature in the chambers 13 are maintained to be equal, so that dew condensation on the inner walls of the tanks 11 due to the temperature difference can be avoided. The breather valve 14 and the vacuum break valve 15 may be provided only for either one of the chambers 13A and 13B. Sloshing of the condensate W in the storage tanks 11 caused by an earthquake can be effectively suppressed by providing a plurality of the communication pipes 17 and 18 or properly determining the cross sectional areas of these pipes.

In a case where it is required to store water by an amount more than that of the condensate W now being stored in the storage tanks 11, the water can easily be supplied through the conduit 20 from the exterior of the combination building without using any special means. Since one end of the conduit 20 is immersed in the condensate W stored in the tank 11A, the radioactive air in the air chambers 13 is never released through the conduit 20 into external atmosphere.

According to this invention, since the condensate storage tank is accommodated in the reactor combination building, a site of a nuclear reactor plant can effectively be utilized and the maintenance and the inspection of the condensate storage tank can be performed at considerably longer intervals because the tank is not affected by adverse meteorological conditions such as rain, snow, wind, or the like. Injuries caused by salt or freezing which occurs when installing the plant in an area near a sea shore or a cold weather district can effectively be avoided.

In addition, the condensate storage tanks 11 are lined with stainless steel plates to have a sufficient strength and bear a stress or weight on the concrete wall of the combination building. The lined tank is formed as a double water-tight structure, so that a radioactive liquid or air is not immediately leaked from the tank even if the lining plate were caused to be broken by an accident such as an earthquake.

Since the ceiling of the condensate storage tank is a concrete floor of a chamber of an upper floor, the ceiling has a strength sufficient for withstanding the sloshing of the condensate. Moreover, according to this invention, the reactor building and the Rad Waste building including the condensate storage tanks are installed as a unitary single building, so that it is not necessary to excavate and level the ground independently for installing the reactor building and the condensate storage building, which reduces the time and danger of a civil working. Structural analysis to the condensate storage tank building against, for example, an earthquake and sloshing caused thereby can be eliminated and mere analysis of the combination building is sufficient. The conduit connecting the storage tank and the reactor pressure vessel can be shortened.

The temperature within the combination building can be effectively maintained at a constant value by the heat capacity of the condensate stored in the tanks, and by this fact the load upon air conditioning and treating units can be decreased. This effect can be increased by positioning this air conditioning unit near the condensate storage tanks.

Because two condensate storage tanks can operate independently, even if one of the tanks were out of order, the other could still operate, so that the reliability or safeness of a nuclear reactor can be maintained.

In addition, as shown in FIG. 4, since the outer walls of the condensate storage tanks are separated from the outer walls of the reactor building and the combination building, hydraulic pressure and thermal stress applied on the condensate storage tanks can be analyzed and treated independently of those applied on the combination building. According to this construction, since the wall of the tank can be constructed at a time different from the construction of the outer wall of the combination building, less problem exists on the order of the construction of the combination building or the other equipments and on the precision of the size thereof. There is little chance to erroneously generate a leakage detection signal by detecting underground water invaded through the wall of the combination building in place of a leak of the condensate in the tank.

With the embodiments of this invention described hereinabove, although two separated condensate storage tanks are located in the reactor combination building, only one or more than two tanks communicated with each other may be accommodated therein. A plurality of communication pipes 17, pipes 18, breather valves 14 and vacuum valves 15 can be provided for the condensate storage tanks for improving the operational reliability thereof. In the illustrated embodiment, although the communication pipes 17 and 18 are located so as to connect the shortest ways between the both condensate storage tanks 11, they can be disposed about the tanks 11 in connection with the structure of the combination building or the other elements such as the breather valve 14 or the vacuum valve 15. An axial pump or a valve which can freely open or close may be located within the communication pipe 18 to limit the flow amount of the condensate W in the both storage tanks 11.

It is to be understood by those skilled in the art that the foregoing description refers to some preferred embodiments of this invention and that various modifications and changes may be made without departing from the true scope and spirit of the invention as defined in the appended claims.

I claim:

1. In a nuclear power plant of a boiling water reactor type including a reactor building containing therein a reactor core and including a reactor containment, a building annex to the reactor building, and a condensate storage area for storing excess condensate as an emergency source for suppressing a superheat condition in said reactor core upon a loss of coolant accident, the improvement wherein said reactor building and said annex building are constructed as a unitary reactor combination building having a lower portion thereof positioned underground, said condensate storage area being located within said reactor combination building in an underground portion of said annexed building and being divided into a plurality of separate, but fluid interconnecting condensate storage tanks containing respective condensates therein, said storage tanks being arranged side by side and communicating with each other by a condensate flow passage disposed above the bottom of said tanks and below a condensate level thereof, a plurality of air chambers being formed respectively in said plurality of condensate storage tanks and above the condensates contained therein, said air chambers in adjacent side by side storage tanks directly communicating with each other, and each of said condensate storage tanks being provided with a water supply pipe having one end immersed into the condensate therein and the other end extending outwardly through an outer wall of said reactor combination building.

2. The nuclear power plant according to claim 1 wherein said air chambers are connected to an air conditioning or treating unit through a breather valve located in said reactor combination building.

3. The nuclear power plant according to claim 1 wherein an outer wall of said condensate storage tank is constructed as a wall common to that of the reactor combination building.

4. The nuclear power plant according to claim 1 wherein an outer wall of said condensate storage tank is constructed independently of the wall of said reactor combination building.

* * * * *